United States Patent
Marsh et al.

(10) Patent No.: US 7,661,199 B2
(45) Date of Patent: Feb. 16, 2010

(54) CODED TARGET FOR USE WITH COMBINATION LASER AND PHOTOGRAMMETRY TARGETS

(75) Inventors: Bobby J. Marsh, Lake Stevens, WA (US); Kinson Van Scotter, Stanwood, WA (US); Brian E. Campbell, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 380 days.

(21) Appl. No.: 11/550,101

(22) Filed: Oct. 17, 2006

(65) Prior Publication Data

US 2007/0267498 A1    Nov. 22, 2007

Related U.S. Application Data

(63) Continuation-in-part of application No. 11/437,201, filed on May 19, 2006, now abandoned.

(51) Int. Cl.
*G01C 15/02* (2006.01)
(52) U.S. Cl. .......................................... 33/293; 356/620
(58) Field of Classification Search .................. 33/286, 33/293, 297, 298, 299, 608; 356/620; 382/141
See application file for complete search history.

(56) References Cited

U.S. PATENT DOCUMENTS

| | | | |
|---|---|---|---|
| 6,017,125 A * | 1/2000 | Vann | 359/529 |
| 6,384,907 B1 * | 5/2002 | Gooch | 356/139.03 |
| 6,484,381 B2 * | 11/2002 | Cunningham et al. | 29/407.09 |
| 6,745,101 B2 | 6/2004 | Andersen et al. | |
| 6,826,299 B2 | 11/2004 | Brown et al. | |
| 7,064,742 B2 * | 6/2006 | Navab et al. | 345/156 |
| 7,454,265 B2 * | 11/2008 | Marsh | 700/195 |
| 7,515,257 B1 * | 4/2009 | Roe et al. | 356/152.3 |
| 7,587,258 B2 * | 9/2009 | Marsh et al. | 700/195 |
| 2004/0027589 A1 * | 2/2004 | Clarke et al. | 356/620 |
| 2005/0200857 A1 * | 9/2005 | Christ et al. | 356/601 |
| 2006/0007452 A1 * | 1/2006 | Gaspard et al. | 356/620 |
| 2007/0206832 A1 * | 9/2007 | Gordon et al. | 382/103 |
| 2009/0148037 A1 * | 6/2009 | Moriyama et al. | 382/154 |

* cited by examiner

*Primary Examiner*—R. Alexander Smith
(74) *Attorney, Agent, or Firm*—Rozenblat IP LLC

(57) ABSTRACT

The invention relates to the use of one or more targets to measure surfaces. The target may comprise a first portion adapted to reflect a laser beam towards a laser tracking device, a second portion adapted to reflect a light beam towards a photogrammetry device, and a third portion adapted to identify to a computer a unique identifier of the target.

40 Claims, 5 Drawing Sheets

CODED TARGET FOR USE WITH COMBINATION LASER AND PHOTOGRAMMETRY TARGETS

RELATED APPLICATIONS

This application is a continuation-in-part application of U.S. application Ser. No. 11/437,201, titled Combination Laser And Photogrammetry Target, filed on May 19, 2006 now abandoned.

BACKGROUND OF THE INVENTION

Photogrammetry devices are known in the art as being relatively useful for measuring large areas of surface in a relatively timely fashion. However, photogrammetry devices are known to have accuracy deficiencies. Conversely, laser tracking devices are known in the art as being relatively useful for taking accurate measurements at predetermined locations. However, laser tracking devices are known to have difficulties measuring large surface areas in a relatively timely fashion. Coded targets are also known in the art for identifying the unique identity of the coded targets, which may be located in a pre-determined location, to a computer. However, many of the existing coded targets do not incorporate the use of both photogrammetry devices and laser tracking devices in order to accurately and efficiently measure a surface. Additionally, many of the existing coded targets are not mobile, do not attach to non-coded targets, and/or have other types of problems.

A target and method for its use is needed which may allow a surface to be measured simultaneously utilizing both photogrammetry and laser tracking, while identifying the unique identify of the target to a computer, to solve one or more problems in measuring surfaces with either photogrammetry or laser tracking alone.

SUMMARY OF THE INVENTION

In one aspect of the invention, a target for use in measuring surfaces is provided. The target comprises a first portion adapted to reflect a laser beam towards a laser tracking device, a second portion adapted to reflect a light beam towards a photogrammetry device, and a third portion adapted to identify to a computer a unique identifier of the target.

In another aspect of the invention, a coded member is provided. The coded member is adapted to be attached to a target for measuring surfaces. The target comprises a first portion adapted to reflect a laser beam towards a laser tracking device, and a second portion adapted to reflect a light beam towards a photogrammetry device. The coded member comprises a unique identifier adapted to identify an identity of the coded member to a computer.

In a further aspect of the invention, a measured surface is provided. The measured surface was measured utilizing at least one target. A location of the at least one target was simultaneously measured by both a laser tracking device and a photogrammetry device. A unique identifier of the target was communicated to at least one computer.

In yet another aspect of the invention, a method for measuring a surface is provided. In one step, a target with a unique identifier is provided. In another step, the target is identified to at least one computer based on the unique identifier. In yet another step, a location of the target is concurrently measured utilizing both laser tracking and photogrammetry.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
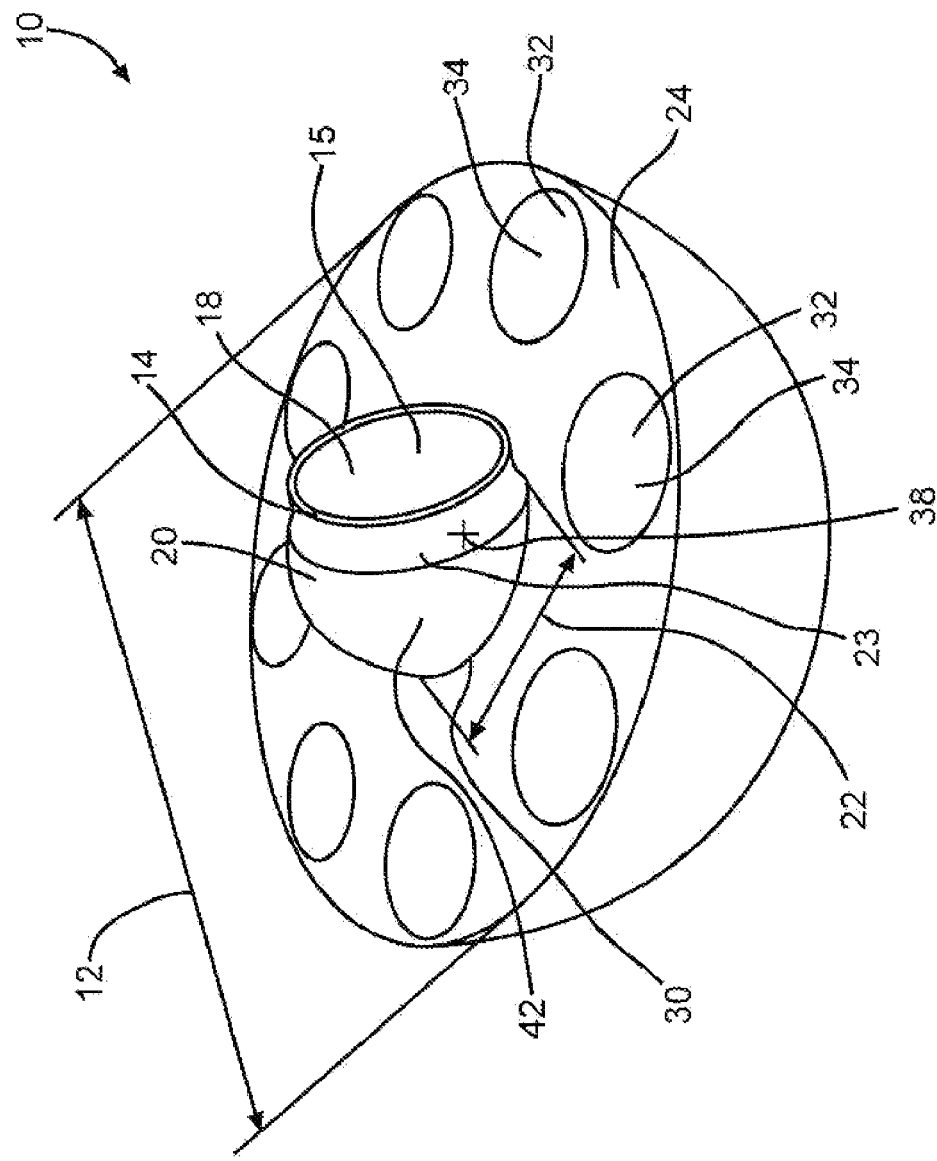
FIG. 1 is a perspective view of one embodiment of a target under the invention.
Figure 2:
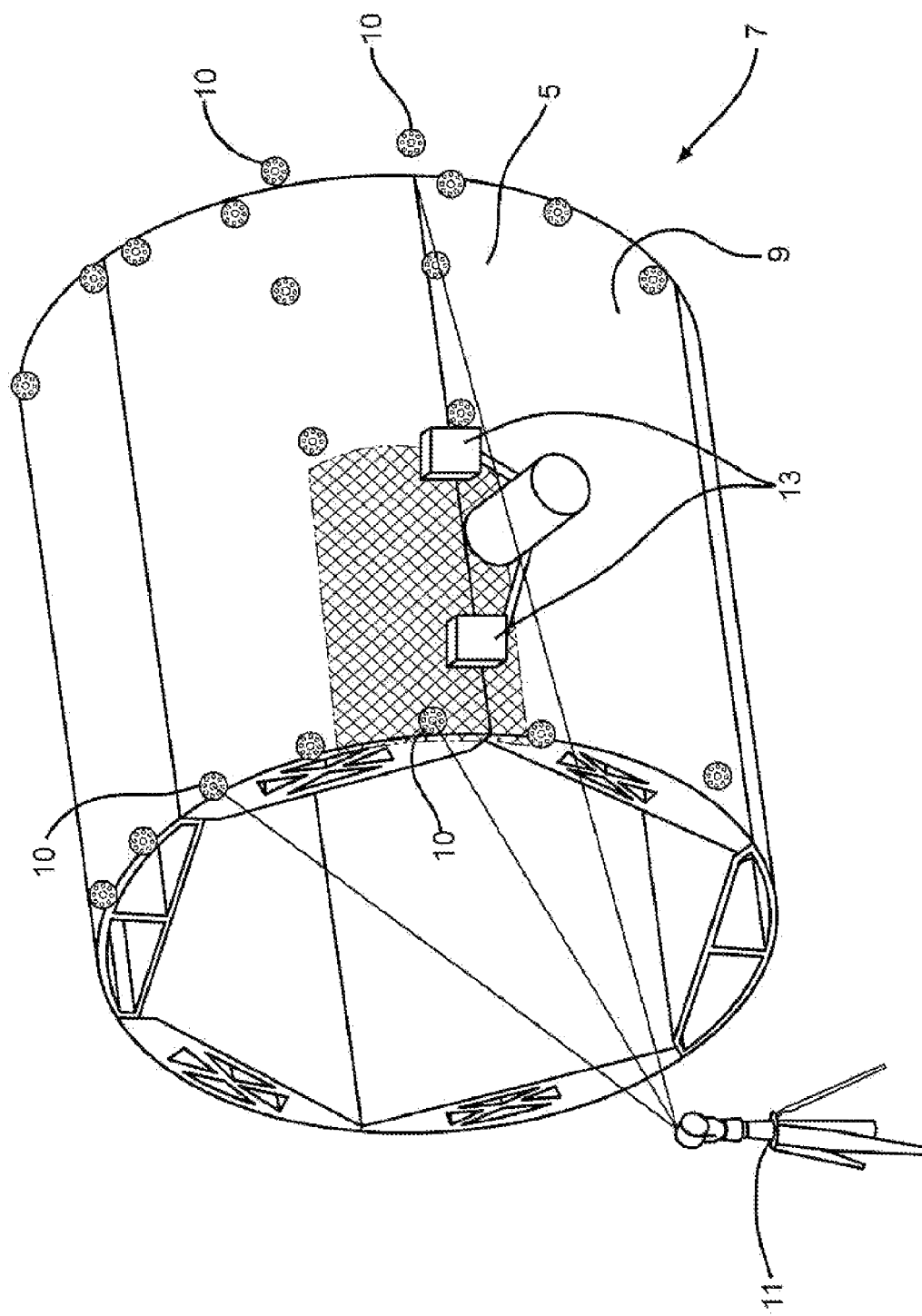
FIG. 2 is a perspective view showing a plurality of the target of FIG. 1 being distributed around a barrel of an airplane to measure a surface of the barrel.

In one embodiment of the invention, as shown in FIG. 1, a target 10 for use in measuring surfaces may have a generally hemispherical shape. As shown in FIG. 2, a plurality of the target 10 of FIG. 1 may be distributed over a surface 5 of an airplane 7, which may comprise an airplane's barrel 9, to measure the surface 5. In other embodiments, one or more targets 10 may be used to measure one or more surfaces in non-airplane applications. One or more locations of the targets 10, distributed over surface 5, may be measured utilizing a combination of a laser tracking device 11 and a photogrammetry device 13. The measured locations of the targets 10 may be utilized to determine the measurements of the surface 5.

In one embodiment, the photogrammetry device 13 may comprise one or more V-Star cameras. In other embodiments, the photogrammetry device 13 may comprise any photogrammetry device known in the art. The target 10 may be made of steel, and may have a diameter 12 substantially in the range of one-half of an inch to two inches. In other embodiments, the target 10 may be made of any material known in the art, and may be in differing shapes, sizes, orientations, and configurations.

The target 10 may comprise a first portion 14 and a second portion 32. The first portion 14 may comprise one or more surfaces 15 which are adapted to reflect a laser beam towards laser tracking device 11. In one embodiment, the first portion 14 may comprise three reflective mirrors 18 attached to a generally spherical surface 20. The first portion 14 may comprise a spherical magnetic reflector (SMR). In other embodiments, any number of mirrors 18 may be utilized, and the mirrors 18 may be attached to differing sized and shaped surfaces of the target 10. In still other embodiments, the first portion 14 may comprise one or more non-mirror reflective surfaces.

The generally spherical surface 20 may have a diameter 22 in the range of one-eighth of an inch to one-inch. In other embodiments, the diameter 22 of the spherical surface 20 may be in varying sizes. The first portion 14 may be located in a center 23 of a surface 24 of the target 10. In other embodiments, first portion 14 may be located in varying portions of the target 10.

The first portion 14 may be attached to the target 10 utilizing one or more magnets (not shown). The one or more magnets may be attached to a surface of an aperture 30 in the target 10 utilizing adhesive, a snap-fit, or other devices known in the art. Aperture 30 may be centrally located with respect to target 10. In other embodiments, first portion 14 may be attached to the target 10 utilizing other devices known in the art. First portion 14 may be adapted to move, relative to both target 10 and second portion 32, into varying planes. The first portion 14 may be adapted to rotate in a variety of directions in order to be located in the same or different planes as second portion 32. In one embodiment, a user of target 10 may rotate first portion 14 utilizing the user's hand.

The second portion 32 may comprise one or more discrete surfaces 34 which are adapted to reflect a light beam towards a photogrammetry device 13, such as one or more V-Star cameras. In one embodiment, the second portion 32 may comprise one or more reflective surfaces 34, adhered to one or more surfaces 24 of the target 10. In other embodiments, reflective surfaces 34 may be attached to target 10 utilizing any manner known in the art. Reflective surfaces 34 may be made of retro-reflective material. In other embodiments, reflective surfaces 34 may be made of any reflective material known in the art.

The reflective surfaces 34 may comprise a plurality of discrete, generally circular, reflective surfaces (dots). In other embodiments, the reflective surfaces 34 may comprise three to seven generally circular, reflective surfaces (dots). In still other embodiments, the reflective surfaces 34 may comprise three to ten generally circular, reflective surfaces (dots). The generally circular, reflective surfaces (dots) may have diameters in the range of one-tenth of an inch to one-half of an inch. In still other embodiments, any number of reflective surfaces 34 may be utilized in any shape, location, orientation, size, or configuration. The second portion 32 may be evenly distributed around first portion 14. First and second portions 14 and 32 may share a common central point 38 which may be located in a center of target 10. In one embodiment, first portion 14 may be located in a central area 42 with respect to a plurality of reflective surfaces 34, and target 10. In other embodiments, first and second portions 14 and 32 may be located in a variety of locations, configurations, and orientations with respect to target 10 and with respect to one another.

Figure 3:
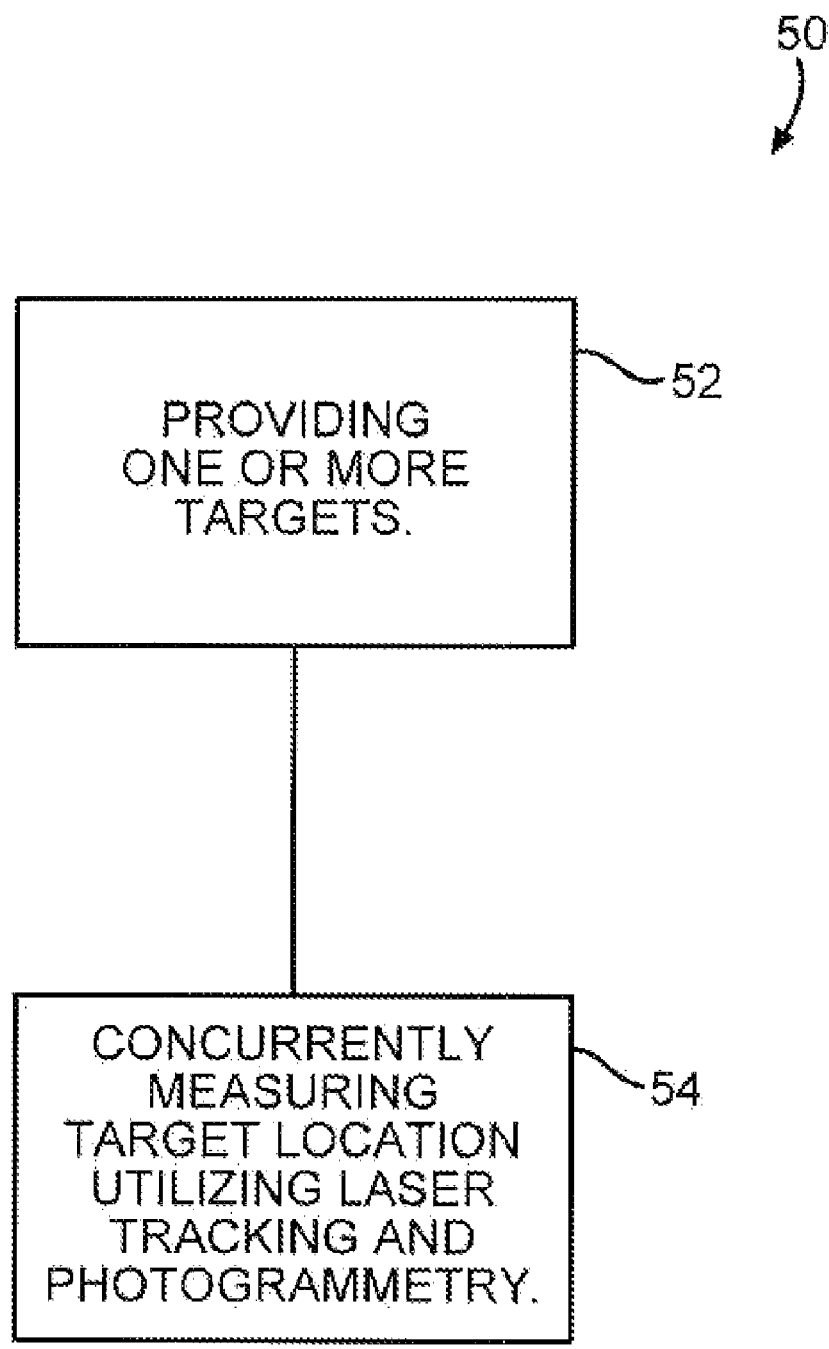
FIG. 3 depicts one embodiment of a method under the invention for measuring a surface.

In another embodiment of the invention, as depicted in FIG. 3, a method 50 for measuring a surface may be provided. The surface to be measured may comprise one or more parts of an airplane. In other embodiments, the surface to be measured may comprise a non-airplane application. One step 52 of the method may comprise providing one or more targets. The provided targets may comprise any of the embodiments of the target 10 disclosed within this specification. In one embodiment, each of the one or more targets 10 may comprise a first reflective portion 14 and a second reflective portion 32.

The provided targets may be distributed over various portions of the surface to be measured. In one embodiment, eighteen targets may be distributed around the circumference of an aft end of a barrel of an airplane, and another eighteen targets may be distributed around the circumference of the forward end of the barrel. In yet another embodiment, substantially in the range of twenty-five to forty-five targets may be distributed around the surface to be measured. In still other embodiments, any number of targets may be located on or in any portion of the surface to be measured.

Another step 54 of the method may comprise concurrently measuring one or more locations of one or more targets utilizing both laser tracking and photogrammetry. In one embodiment, the step 54 may comprise measuring X plane, Y plane, and/or Z plane locations of one or more targets. In other embodiments, step 54 may comprise taking varying measurements of one or more target locations. During step 54, a light emitting device, such as a Prospot, may emit one or more light beams onto the surface to be measured. The one or more light beams emitted by the Prospot may take the shape of a multitude of dots, in any size or shape, distributed over the surface to be measured. In one embodiment, hundreds of light-beam dots may be directed onto the surface to be measured. The emitted light-beam dots may act as a grid system to locate one or more targets with respect to various portions of the measured surface.

During step 54, the first reflective portion of the one or more targets may reflect one or more laser beams emitted from one or more laser tracking devices back towards the one or more laser tracking devices. Simultaneously, the second reflective portion of the one or more targets may reflect one or more light beams emitted from one or more photogrammetry devices back towards the one or more photogrammetry devices. The photogrammetry devices may comprise one or more V-Star cameras. By simultaneously utilizing both photogrammetry and laser tracking, one or more location measurements of one or more targets may be arrived at using combined photogrammetry and laser tracking measurements.

The photogrammetry and laser tracking measurements may be combined into one or more measurements of the targets utilizing one or more computers to interactively communicate and determine the one or more combined target measurements. The one or more combined target measurements may be utilized to determine one or more measurements of the surface. In one embodiment, measurements of the surface may be determined in the X plane, the Y plane, and/or the Z plane. In other embodiments, varying measurements of the surface may be determined.

Combining two inspection technologies, laser tracking and photogrammetry, to determine a surface's measurements may provide more accurate measurements, more efficient measurements, more timely measurements, and/or less costly measurements.

Figure 4:
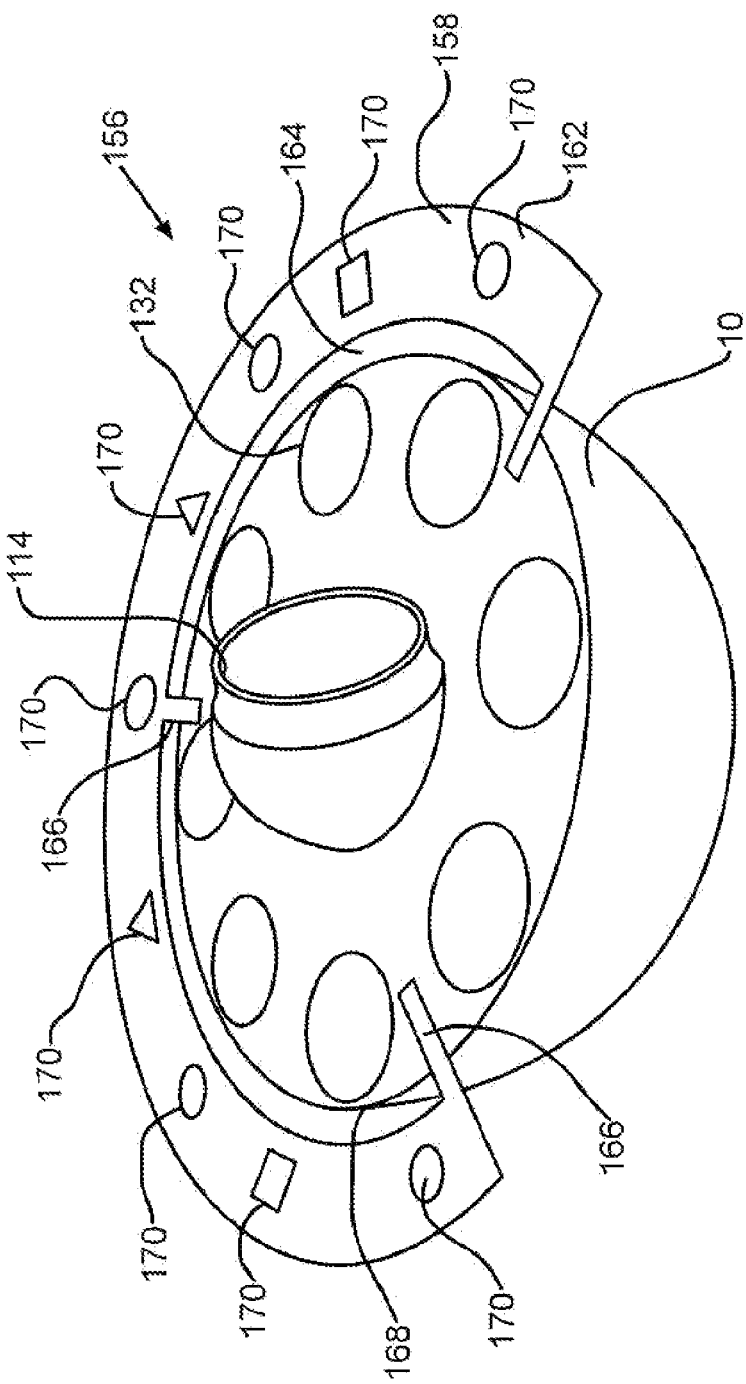
FIG. 4 is a perspective view of one embodiment of a target under the invention.

In another embodiment of the invention, as shown in FIG. 4, target 156 may comprise a third portion 158 attached to substantially hemispherical target 10 of FIG. 1. In such manner, the third portion 158 may be moved with the target 156. The third portion 158 may comprise a plastic, substantially semi-circular, planar member 162 defined by an inner hole 164. In other embodiments, the shape, configuration, size, material, and orientation of target 156 may vary.

Aside from third portion 158, target 156 may include all of the same features and functions as previously discussed with respect to target 10 of FIG. 1, and may include any of the above-referenced embodiments. For instance, target 156 may be used in measuring surfaces, such as an airplane surface or other type of non-airplane surface, and may include a first portion 114 and a second portion 132. The first portion 114 may be adapted to reflect a laser beam towards a laser tracking device (not shown) through one or more mirrors, while the second portion 132 may be adapted to reflect a light beam towards a photogrammetry device utilizing one or more reflective surfaces.

Third portion 158 may be adapted to be attached and detached from the target 156. In one embodiment, as shown in FIG. 4, the third portion 158 may be attached and detached from second portion 132 utilizing three snap-fit members 166. In other embodiments, any number of differing attachment mechanisms may be utilized such as an adhesive, a bolt-fit, or other mechanism. When the third portion 158 is attached to the target 156, it may substantially overlay the first and second portions 114 and 132 of target 156. In this position, the substantially semi-circular, planar member 162 may substantially extend around the exterior perimeter 168 of the first and second portions 114 and 132, while the first and second portions 114 and 132 may be substantially disposed within the inner hole 164. In still other embodiments, the third portion 158 may be attached to the target 156 in a variety of configurations and/or orientations. In further embodiments, the third portion 158 may comprise a portion of target 10 of FIG. 1 so that planar member 162 is not necessary. For instance, in one embodiment, the second and third portions 132 and 158 may be identical.

Third portion 158 may be adapted to identify to a computer (not shown) a unique identifier of the target 156 so that the computer may recognize which target it is receiving data from. The unique identifier of the third portion 158 may comprise a unique coded pattern which is recognizable to a computer in order to identify the target 156. In one embodiment, as shown in FIG. 4, the unique coded pattern may comprise nine reflective surfaces 170, each in the shape of a circle, square, rectangle, or triangle, which are attached to the third portion 158. The reflective surfaces 170 may be glued directly to the third portion 158. In other embodiments, the reflective surfaces 170 may be attached to the third portion 158 utilizing other mechanism known in the art.

The reflective surfaces 170 may be adapted to reflect light towards a photogrammetry device (not shown) which may be directly or indirectly connected to a computer. Based on the configuration and intensity of the reflected light, the photogrammetry device may determine the configuration and orientation of the reflective surfaces 170 (the unique coded pattern) in order to identify the identity of the coded target 156. Three of the nine reflective surfaces 170 may identify the target 156 as generally being a coded target 156, while the other six of the reflective surfaces 170 may uniquely identify the particular coded target 156 by an assigned target number, code, or other mechanism. In other embodiments, the unique coded pattern may comprise differing types and numbers of surfaces in varying shapes, sizes, configurations, and orientations, and differing mechanisms may be utilized to generally and/or particularly identify the coded target 156.

In one embodiment, the target 156 may be assigned to be located in a certain area of the surface to be measured. For instance, the target 156 may be assigned as target number one which is assigned to be located in a certain nominal X, Y, Z spatial coordinate area of the fuselage of an airplane. Another target may be assigned as target number two which is assigned to be located in another certain nominal X, Y, Z spatial coordinate area of the fuselage, with still other targets being assigned varying numbers and locations of the airplane. In such manner, multiple targets 156 may be utilized to measure a surface, with each target 156 being assigned an identifier and located in a particular location.

In another embodiment, a coded member, which may comprise a unique identifier adapted to identify an identity of the coded member to a computer, may be provided which is adapted to be attached to a target for measuring surfaces, such as an airplane surface or other type of non-airplane surface. In such manner, the coded member may be adapted to be retroactively attached to pre-existing targets which are not coded (i.e. which are not adapted to uniquely identify the target through a pattern, or through other means). The coded member may comprise any of the disclosed embodiments and disclosed functions of third portion 158. For instance, in one embodiment, the coded member may comprise a plastic, substantially semi-circular, planar member 162 defined by an inner hole 164, with a plurality of attached reflective surfaces 170 which are adapted to reflect light towards a photogrammetry device. Similarly, the target, to which the coded member is adapted to be attached, may comprise any of the disclosed embodiments of target 10 of FIG. 1. The coded member may be adapted to identify the identity of the coded member to a computer, while a location of the target may be measured utilizing laser tracking and photogrammetry devices.

In still another embodiment, a measured surface may be provided. The measured surface may comprise a surface of an airplane, or other type of non-airplane surface. The measured surface may have been measured utilizing at least one target, a location of the at least one target having been simultaneously measured by both a laser tracking device and a photogrammetry device. A unique identifier of the target may have been communicated to one or more computers. The unique identifier may have comprised a plurality of reflective surfaces in a known pattern which reflected a light beam towards a photogrammetry device. For purposes of this embodiment, the target, laser tracking device, photogrammetry device, and reflective surfaces may comprise any of the embodiments disclosed herein.

Figure 5:
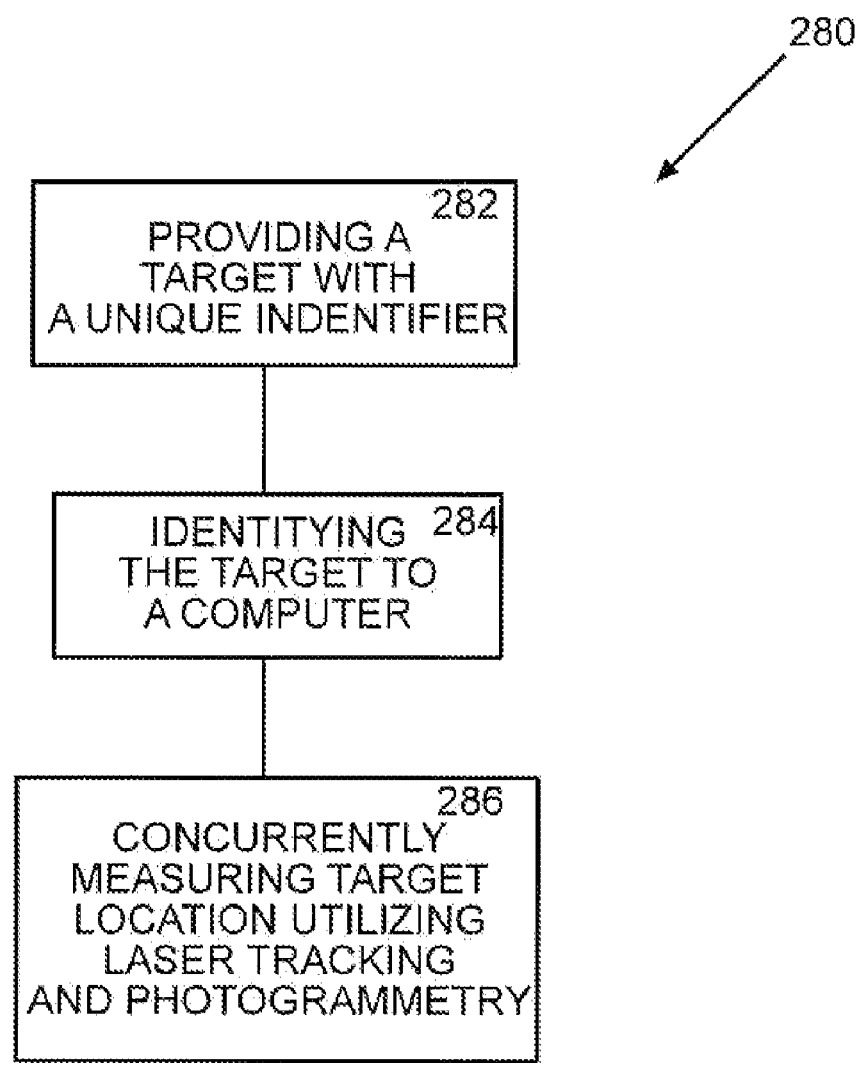
FIG. 5 depicts one embodiment of a method under the invention for measuring a surface.

In yet another embodiment of the invention, as depicted in FIG. 5, a method 280 for measuring a surface is provided. The surface to be measured may comprise one or more parts of an airplane. In other embodiments, the surface to be measured may comprise a non-airplane application. One step 282 of the method may comprise providing a target with a unique identifier. The unique identifier may comprise a coded member having a particular recognized pattern, such as a plurality of reflective surfaces in a unique pattern. The reflective surfaces may each be in the shape of a circle, square, rectangle, triangle, and/or in another type of shape. The coded member may be attached to the target. Another step 284 of the method may comprise identifying the target to one or more computers based on the unique identifier. This step may comprise reflecting a light beam off the reflective surfaces towards a photogrammetry device which is connected and/or networked to the computer. Still another step 286 of the method may comprise concurrently measuring a location of the target utilizing both laser tracking and photogrammetry. In another embodiment, the method may utilize a plurality of targets to measure the surface.

This invention may aid one or more computers which are conducting the measuring process by helping the computer(s), and/or laser and photogrammetry devices, to locate and identify the various targets. The use of a unique identifier may allow the measuring process to be improved in one or more ways such as being more efficient, being more timely, being less difficult to administer, being more accurate, being more automated, requiring less human interaction/administration, having less errors, and/or other types of improvements.

It should be understood, of course, that the foregoing relates to exemplary embodiments of the invention and that modifications may be made without departing from the spirit and scope of the invention as set forth in the following claims.

We claim:

1. A target for use in measuring surfaces comprising:
  a first portion adapted to reflect a laser beam towards a laser tracking device;
  a separate second portion adapted to reflect a light beam towards a photogrammetry device; and
  a separate third portion comprising a unique identifier comprising a plurality of differently shaped reflective surfaces which identify the target as being a coded target and which also uniquely identify the target.

2. The target of claim 1, wherein said target is substantially in the shape of a hemisphere.

3. The target of claim 1, wherein said reflective surfaces are in a unique pattern.

4. The target of claim 1, wherein said plurality of different shaped reflective surfaces comprise nine reflective surfaces.

5. The target of claim 4, wherein three of said reflective surfaces identify said target as being the coded target, and six of said reflective surfaces uniquely identify the target.

6. The target of claim 1, wherein said reflective surfaces are adapted to reflect said light beam towards said photogrammetry device.

7. The target of claim 1, wherein some of said reflective surfaces identify said target as being the coded target, while other of said reflective surfaces uniquely identify the target.

8. The target of claim 1, wherein said reflective surfaces have the shapes of a plurality of a circle, triangle, rectangle, and square.

9. The target of claim 1, wherein said reflective surfaces comprises circles, triangles, and squares.

10. The target of claim 1, wherein said third portion is adapted to be attached and detached from said target.

11. The target of claim 10, wherein said third portion comprises a semi-circular member defined by an inner hole.

12. The target of claim 11, wherein said semi-circular member substantially extends around exteriors of said first and second portions, and said first and second portions are substantially disposed within said inner hole.

13. The target of claim 10, wherein said third portion is adapted to be attached and detached from said target utilizing at least one of a snap-fit, an adhesive, and a bolt-fit.

14. The target of claim 10, wherein said third portion is disposed apart from said first and second portions.

15. The target of claim 1, wherein said third portion comprises a separate member, and said plurality of reflective surfaces are attached to said separate member.

16. The target of claim 15, wherein said member is substantially planar.

17. The target of claim 16, wherein said member is made of plastic.

18. The target of claim 1, wherein said first portion comprises one or more mirrors, said second portion comprises another plurality of reflective surfaces, and said first portion and said second portion identify a location of the target.

19. The target of claim 1, wherein the target is attached to a portion of an airplane.

20. A coded member adapted to be attached to a target for measuring surfaces, wherein said target comprises a first portion adapted to reflect a laser beam towards a laser tracking device and a second portion adapted to reflect a light beam towards a photogrammetry device, wherein said coded member comprises a unique identifier comprising a plurality of differently shaped reflective surfaces for identifying the target as being a coded target and for also uniquely identifying the target.

21. The coded member of claim 20, wherein said coded member is adapted to be at least one of snap-fit, adhered, and bolted to said target.

22. The coded member of claim 21, wherein said coded member is adapted to be attached substantially around an exterior of said target.

23. The coded member of claim 20, wherein some of said reflective surfaces identify said coded member as being a member which is coded, while other of said reflective surfaces uniquely identify the coded member.

24. The coded member of claim 23, wherein said coded member comprises nine reflective surfaces, three of the reflective surfaces identify the target as being the coded target, and six of the reflective surfaces uniquely identify the target.

25. The coded member of claim 23, wherein said reflective surfaces are in the shapes of circles, triangles, and squares.

26. The coded member of claim 23, wherein a location of said target is measured utilizing said first portion, said second portion, said laser tracking device, and photogrammetry device.

27. The coded member of claim 20, wherein said reflective surfaces are in a unique pattern.

28. The coded member of claim 20, wherein said reflective surfaces are adapted to reflect said light beam towards said photogrammetry device.

29. The coded member of claim 20, wherein said coded member is attached to said target and said target is attached to a portion of an airplane.

30. The coded member of claim 20, wherein said coded member is substantially planar and comprises a semi-circular member defined by an inner hole.

31. A method for measuring a surface comprising:
providing a target with a unique identifier comprising a plurality of differently shaped reflective surfaces;
identifying said target to at least one computer, as being a coded target and uniquely identifying the target, based on said unique identifier; and
concurrently measuring a location of said target utilizing both laser tracking and photogrammetry.

32. The method of claim 31, wherein the method is used to measure a surface of an airplane.

33. The method of claim 31, further comprising attaching a separate member, having the unique identifier, to the target.

34. The method of claim 33, wherein the separate member is attached to said target using at least one of a snap-fit, an adhesive, and a bolt-fit.

35. The method of claim 31, wherein the reflective surfaces are in a unique pattern.

36. The method of claim 35, wherein said reflective surfaces are each in the shape of at least one of a circle, square, rectangle, and triangle.

37. The method of claim 35, wherein the identifying said target to at least one computer based on said unique identifier comprises reflecting a light beam off said reflective surfaces towards a photogrammetry device which is at least one of connected and networked to said computer.

38. The method of claim 31, wherein the method utilizes a plurality of the target.

39. The method of claim 31, wherein the identifying the target to the at least one computer comprises some of the differently shaped reflective surfaces identifying the target as being the coded target and some of the other differently shaped reflective surfaces uniquely identifying the target.

40. The method of claim 39, wherein the unique identifier comprises nine differently shaped reflective surfaces, three of the reflective surfaces identify the target as being the coded target, and the other six of the reflective surfaces uniquely identify the target.

* * * * *